US012743369B2

(12) United States Patent
Park

(10) Patent No.: US 12,743,369 B2
(45) Date of Patent: Sep. 22, 2026

(54) MEMORY SYSTEM FOR PROCESSING WRITTEN DATA BY ZONE AND METHOD OF OPERATING THE SAME

(71) Applicant: SK hynix Inc., Icheon-si (KR)

(72) Inventor: Youn Won Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 89 days.

(21) Appl. No.: 18/792,246

(22) Filed: Aug. 1, 2024

(65) Prior Publication Data

US 2025/0291711 A1 Sep. 18, 2025

(30) Foreign Application Priority Data

Mar. 18, 2024 (KR) ........................ 10-2024-0037108

(51) Int. Cl.
*G06F 12/02* (2006.01)
*G06F 12/06* (2006.01)

(52) U.S. Cl.
CPC ........ *G06F 12/023* (2013.01); *G06F 12/0646* (2013.01)

(58) Field of Classification Search
CPC .. G06F 12/023; G06F 12/0646; G06F 3/0604; G06F 3/0614; G06F 3/064; G06F 3/0653; G06F 3/0658; G06F 11/10; G06F 2212/1016; G06F 2212/1032; G06F 2212/403
See application file for complete search history.

(56) References Cited

U.S. PATENT DOCUMENTS 7,752,340 B1 * 7/2010 Porat .................... G06F 11/1443 710/5
2015/0135023 A1 * 5/2015 Mekhanik .......... G11C 16/0483 714/704
2016/0224265 A1 * 8/2016 Chinnakkonda Vidyapoornachary ...................... G06F 12/0893
2016/0283308 A1 * 9/2016 Earhart .................... G06F 11/08
2018/0189135 A1 * 7/2018 Naik ..................... G11C 29/028
2022/0050758 A1 * 2/2022 Sheperek .............. G06F 3/0619
2022/0066648 A1 * 3/2022 Gunda ................ G11C 11/5635
2022/0100419 A1 * 3/2022 Jang ...................... G06F 3/0659
2022/0300366 A1 * 9/2022 Stoller ................ G06F 11/3037
2023/0280926 A1 * 9/2023 Kelner .................. G06F 3/0619
(Continued)

FOREIGN PATENT DOCUMENTS

KR 10-239503 B1 10/1999
KR 10-2023-0115195 A 8/2023
KR 10-2024-0058763 A 5/2024

*Primary Examiner* — Michael Krofcheck

(57) ABSTRACT

A memory system may include a memory device including a plurality of memory regions and a memory controller configured to control the memory device and allocate some of the plurality of memory regions based on an allocation request of the memory device, the allocation request being provided from an external device. The memory controller is configured to perform a write request provided from the external device to at least one of the allocated memory regions, and monitor a size of written data in the at least one of the allocated memory regions based on the write request. When an error is detected in a first memory region among the allocated memory regions while performing of the write request of the external device, the memory controller is configured to determine whether to maintain the allocation of the first memory region.

18 Claims, 6 Drawing Sheets

(56) References Cited

U.S. PATENT DOCUMENTS

| | | | | |
|---|---|---|---|---|
| 2023/0409236 | A1* | 12/2023 | Muthiah | G06F 3/0659 |
| 2024/0070067 | A1* | 2/2024 | Choi | G06F 3/0679 |
| 2025/0279147 | A1* | 9/2025 | Xu | G11C 16/349 |

* cited by examiner

FIG. 2

MEMORY SYSTEM FOR PROCESSING WRITTEN DATA BY ZONE AND METHOD OF OPERATING THE SAME

CROSS-REFERENCE TO RELATED APPLICATION

The present application claims priority under 35 U.S.C. § 119 (a) to Korean application number 10-2024-0037108, filed on Mar. 18, 2024, in the Korean Intellectual Property Office, which is incorporated herein by reference in its entirety.

BACKGROUND

1. Technical Field

Example embodiments relate to a semiconductor integrated device, and more particularly, to a memory system for processing data by a zone and a method of operating the same.

2. Related Art

A memory system using a nonvolatile memory device may perform an internal management operation such as a garbage collection, a wear leveling, and the like in order to prevent the waste of storage space. The internal management operation may require additional access to the nonvolatile memory device, which reduces the operational lifetime of a memory system.

In addition, over-provisioning (OP) regions are allocated for performing the internal management operations in the storage space. Thus, the available storage capacity of a nonvolatile memory device in the memory system is reduced due to the over-provisioning.

In order to improve the available capacity of the nonvolatile memory devices in memory systems, memory blocks of nonvolatile memory devices may include at least one zone. Data related to the zone is stored sequentially in the zone. This zone-based operation method is currently used as a data storage method for the non-volatile memory devices.

SUMMARY

According to disclosed embodiments, there may be provided a memory system. The memory system may include a memory device including a plurality of memory regions; and a memory controller configured to control the memory device and to receive an allocation request provided from an external device, and to allocate some of the plurality of memory regions the allocation request. The memory controller is configured to perform a write request from the external device to at least one of the allocated memory regions, and to monitor a size of written data in the at least one of the allocated memory regions based on the write request. When an error is detected in a first memory region among the allocated memory regions while performing of the write request, the memory controller is configured to determine whether to maintain the allocation of the first memory region using the monitored size of written data.

According to example embodiments, there may be provided a method of operating a memory system which includes a memory device including a plurality of memory regions and a memory controller configured to control the memory device. In the method of operating the memory system, the memory controller may allocate at least one of the plurality of memory regions as allocated memory zones according to an allocation request of the external device. A write request of the external device may be performed in at least one of the allocated memory zones. A size of written data written by the write request in the at least one of allocated memory zones may be monitored. The memory controller may determine whether to maintain the allocation of a first memory zone from among the at least one of the allocated memory zones based on monitoring the size of written data, when an error is detected while performing the write request in the first memory zone.

BRIEF DESCRIPTION OF THE DRAWINGS

The above and another aspects, features and advantages of the subject matter of the present disclosure will be more clearly understood from the following detailed description taken in conjunction with the accompanying drawings, in which:

FIG. 2 is a block diagram illustrating a memory device in accordance with embodiments of the disclosure;

DETAILED DESCRIPTION

Various example embodiments will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the example embodiments as defined in the appended claims.

Example embodiments are described herein with reference to cross-section and/or plan illustrations of idealized embodiments of the example embodiments. However, embodiments of the example embodiments should not be construed as limiting the inventive concepts. Although only a few example embodiments will be shown and described, it will be appreciated by those of ordinary skill in the art that changes may be made in these examples without departing from the principles and spirit of the disclosed embodiments.

As used herein, the term “configured” refers to a size, shape, material composition, orientation, or arrangement of one or more of at least one structure and at least one apparatus facilitating operation of one or more of the structure and the apparatus in a pre-determined way.

As used herein, the singular forms of "a," "an," and "the" are intended to include the plural forms as well, unless the context clearly indicates otherwise.

As used herein, the phrase "coupled to" and "connected to" refer to structures operatively connected with each other, such as electrically connected through a direct Ohmic connection or through an indirect connection (e.g., by way of another structure).

Figure 1:
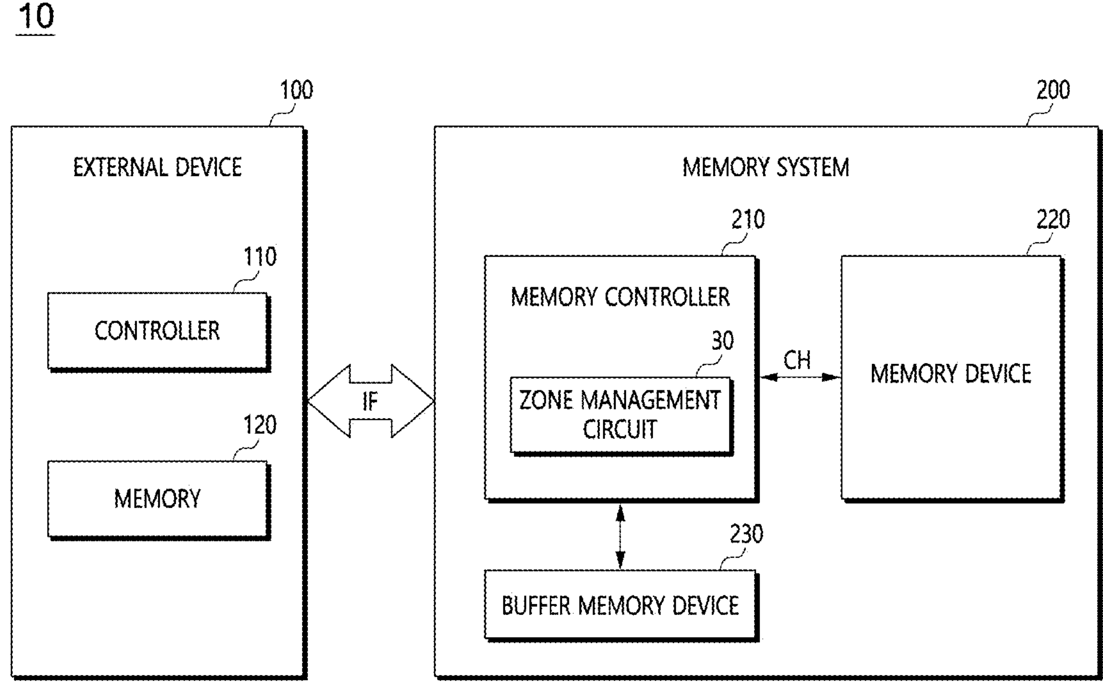
FIG. 1 is a block diagram illustrating an electronic device in accordance with embodiments of the disclosure.

FIG. 1 is a block diagram illustrating an electronic device in accordance with embodiments of the disclosure.

Referring to FIG. 1, an electronic device 10 may include an external device 100 and a memory system 200 configured to perform data exchange with the external device 100.

For example, the external device 100 may include a host device electrically coupled to the memory system 200.

The external device 100 and the memory system 200 may be electrically coupled with each other through an interface IF. In some examples, the interface IF may provide a physical connection between the external device 100 and the memory system 200.

The interface (IF) between the external device 100 and the memory system 200 may include at least one of various interface protocols such as a universal serial bus (USB) protocol, a multimedia card (MMC) protocol, a peripheral component interconnection (PCI-express) protocol, a PCI (PCI-express) protocol, an advanced technology attachment (ATA) protocol, a serial-ATA (SATA) protocol, a small computer small interface (SCSI) protocol, an integrated drive electronics (IDE) protocol, a private protocol, a system management bus (SMBus) protocol, an I2C (Inter-Integrated Circuit) protocol, and an embedded inter-integrated circuit (I3C) protocol.

The external device 100 may be configured to include a controller 110 and a memory 120 to write data to the memory system 200 or to read data written to the memory system 200.

The controller 110 may allocate a logical zone, which is an independent logical storage space, to each application program that is executed in the external device 100. The controller 110 may be a file system such as a flash-friendly file system (F2FS) or a circuit for managing and controlling the file system.

The memory 120 may store file data provided from the application program that is used to store data in the memory system 200. For example, the memory 120 may include a volatile memory such as DRAM, SDRAM, DDR SDRAM, LPDDR SDRAM, and GRAM, but embodiments are not limited thereto.

The memory system 200 may include a memory controller 210, a memory device 220, and a buffer memory device 230.

The memory controller 210 may control the memory device 220 in response to at least one request provided from the external device 100. For example, the memory controller 210 may write (or program) data to the memory device 220 in response to a write request provide from the external device 100. The memory controller 210 may read the written data (or programmed data) in the memory device 220 in response to a read request of the external device 100. The memory controller 210 may provide the external device 100 with the read data.

The memory controller 210 may divide the memory device 220 into a random number of memory areas that are physical storage regions according to set references. The memory controller 210 may manage the writing of data in each of the physical storage regions. Each physical storage region of the memory device 220 may correspond to a physical zone. For example, a physical storage region may correspond to a logical zone, which is a management unit of the controller 110.

The memory system 200 that operates using zones may be referred to as a zone-based memory system. A zone-based memory system is configured to map and manage logical zones managed by a file system of the external device 100 using the sizes of the physical zones into which the physical storage regions of the memory system 200 are grouped. Furthermore, in the zone-based memory system, a memory controller 210 may include a zone management circuit 30 to generate and manage the zones.

The memory device 220 may write data or output written data in response to a command and/or data transmitted from the memory controller 210 through at least one channel CH. The memory device 220 may include a volatile or nonvolatile memory device. In example embodiments, the memory device 220 may include an electrically easy and programmable ROM (EEPROM), a NAND flash memory, a NOR flash memory, a phase-change RAM (PRAM), a reactive RAM (ReRAM), a ferroelectric RAM (FRAM), a spin torque transfer magnetic RAM (STT-MRAM), and the like. The memory device 220 may include a plurality of dies, a plurality of chips, or a plurality of packages. Further, the memory device 220 may operate as a single-level cell storing one bit of data in one memory cell or a multi-level cell storing a plurality of bits of data in one memory cell.

The buffer memory device 230 may temporarily store write data to be written in the memory device 220 or data read from the memory device 220. Although not illustrated, the buffer memory device 230 may be included in the memory controller 210 in some embodiments.

Figure 2:
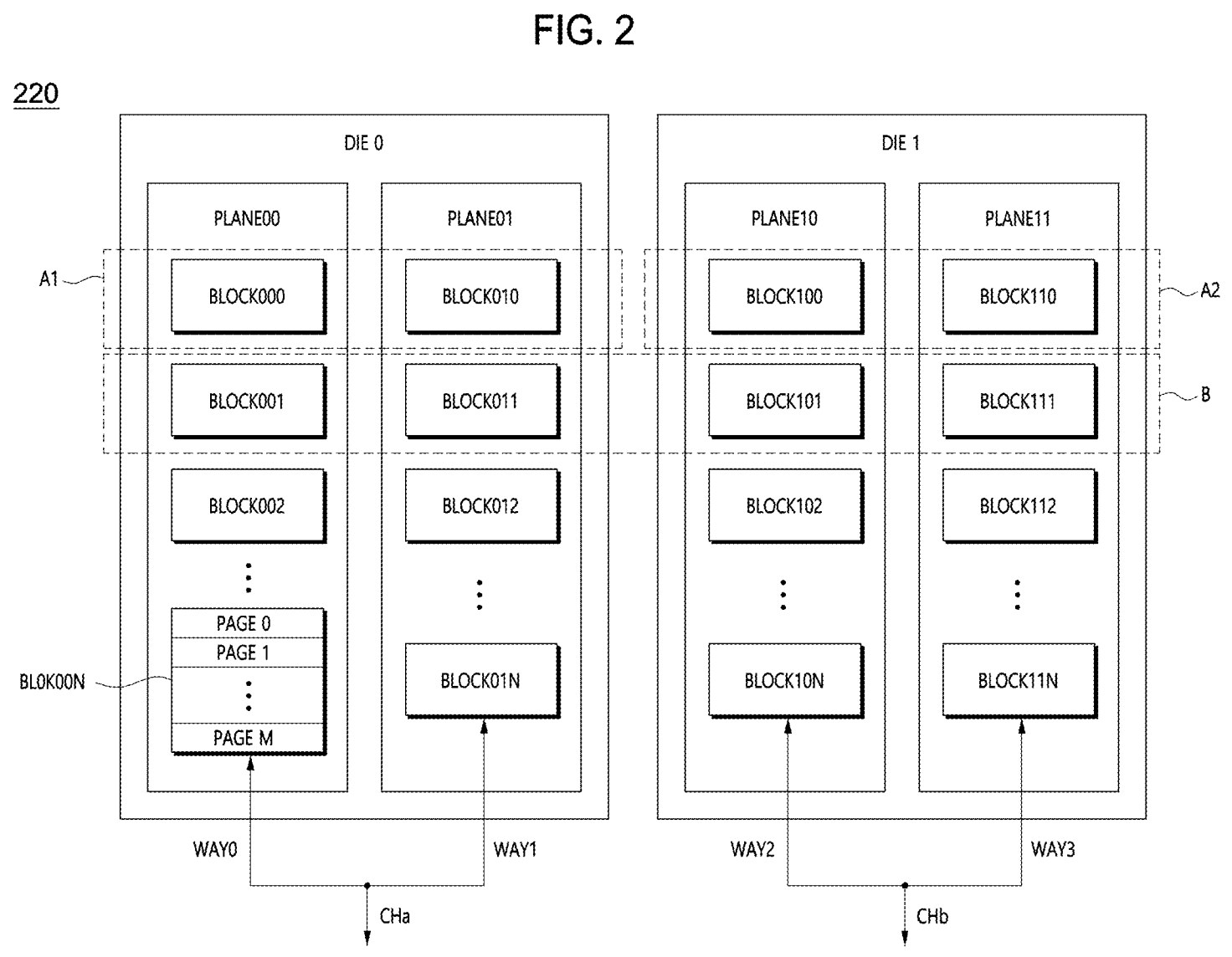

FIG. 2 is a block diagram illustrating a memory device in accordance with embodiments of the disclosure.

Referring to FIG. 2, a memory device 220 may include a plurality of dies DIE0 and DIE1. Each of the dies DIE0 and DIE1 may include a plurality of planes PLANE00/PLANE01 and PLANE10/PLANE11, respectively. Each of the planes PLANE00/PLANE01 may include a plurality of memory blocks BLOCK000 to BLOCK00N and BLOCK010 to BLOCK01N, respectively. Each of the memory blocks BLOCK000 to BLOCK00N and BLOCK010 to BLOCK01N may include a plurality of pages PAGE 0 to PAGE M. Each of the planes PLANE10/PLANE11 may include a plurality of memory blocks BLOCK100 to BLOCK10N and BLOCK110 to BLOCK11N, respectively. Although not illustrated, each of the memory blocks BLOCK100 to BLOCK10N and BLOCK110 to BLOCK11N may include a plurality of pages PAGE 0 to PAGE M.

The memory device 220 may input/output data through channels CHa and CHb. Each of the channels CHa and CHb may input/output data in an interleaving manner. The channels CHa and CHb may be branched into a plurality of paths WAY0, WAY1 and WAY2, WAY3 respectively. The plurality of paths WAY0, WAY1 and WAY2, WAY3 are respectively configured to share the channels CHa and CHb and to be electrically coupled to planes PLANE00/PLANE01 and PLANE10/PLANE11.

FIG. 2 illustrates an example in which each die DIE0 and DIE1 may be connected respectively to independent channels CHa and CHb and to each plane PLANE00/PLANE01 and PLANE10/PLANE11 via the plurality of paths WAY0, WAY1, WAY2 and WAY3. Disclose embodiments of the configuration of the memory device 220, however, are not limited to the schematic illustration in FIG. 2.

For example, a memory device 220 may be configured into at least one super block by grouping simultaneously selectable memory blocks from among a plurality of memory blocks.

For example, each of super blocks A1 and A2 may be configured by grouping the memory blocks in different planes into the same die.

Alternately, a super block B may be configured by grouping memory blocks in different planes in a plurality of dies. A super block A1, A2 or B may be a combination of simultaneously selected memory blocks.

Each of the super blocks A1, A2 and B may correspond to a logical zone used by the external device 100 to manage a memory device 220.

For example, in a zone-based memory system 200, a physical zone of the memory device 220 may be a super block SB, and the super block SB may be allocated in a manner to correspond to a logical zone of the external device 100.

Figure 3:
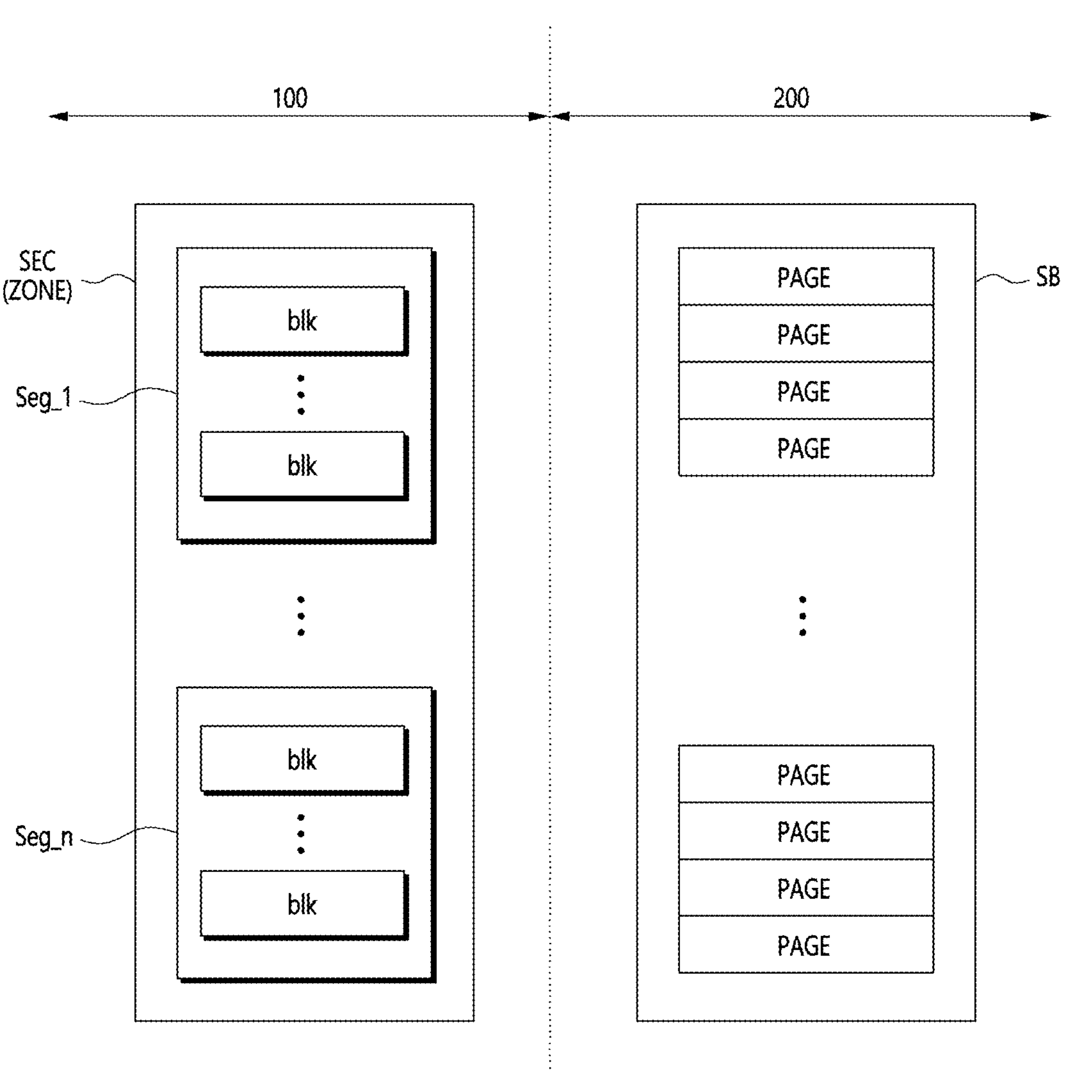
FIG. 3 is a block diagram illustrating a concept of a zone in accordance with embodiments of the disclosure.

FIG. 3 is a block diagram illustrating a concept of a zone in accordance with embodiments of the disclosure.

In FIG. 3 a block diagram illustrates a relationship between a section SEC, which may be a unit configured to manage data in a controller 110 of an external device 100, and a super block SB of a memory system 200.

The controller 110 of the external device 100 may manage data in units of sections SEC. A section SEC may include a plurality of segments Seg_1 to Seg_n. Each of the segments Seg_1 to Seg_n may include a plurality of memory blocks blk. When requesting a write operation, for example, a data storage request or a write request may be generated by the application program, at least one of the plurality of segments Seg_1 to Seg_n or at least one of the plurality of memory block blk may be allocated (or selected).

For example, a section SEC may be a logical zone managed by the external device 100. The section SEC may correspond to a physical zone of a super block SB in a memory device 220 of the memory system 200. Alternatively, the size of the section SEC may be the same as the size of the super block SB. Thus, as the size of the super block SB in the memory device 220 increases, the size of the section SEC also increases.

Because the controller 110 of the external device 100 may manage data in units of sections SEC corresponding to super blocks SB, which is also the unit in which data may be stored and managed in the memory device 220, the management of a storage region in which data may be stored in the memory device 220 is improved.

As described above, a zone-based memory system provides high performance without interference between a plurality of operating systems and a plurality of application programs in a data center of a multi-tenant environment. In a zone-based memory system, a memory controller 210 may operate a memory device 220 so that each of a plurality of application programs executed in an external device 100 sequentially stores data in a zone allocated to the external device 100.

Figure 4:
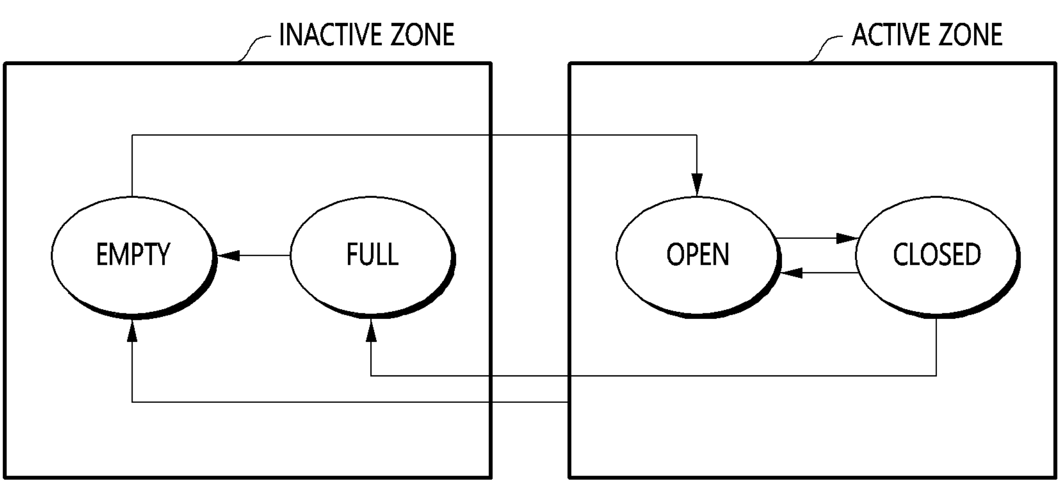
FIG. 4 is a diagram illustrating a state of a zone in accordance with embodiments of the disclosure.

FIG. 4 is a diagram illustrating a state of a zone in accordance with embodiments of the disclosure.

Referring to FIG. 1 to FIG. 4, a memory controller 210 may generate a physical zone corresponding to a logical zone of an external device 100 in accordance with the requests of the external device 100. The state of the physical zone that is generated by the memory controller 210 may be divided into at least one active zone "ACTIVE ZONE" and at least one inactive zone "INACTIVE ZONE".

The zone included in the active zone "ACTIVE ZONE" may include an open zone "OPEN" in a state in use and/or a closed zone "CLOSED" in a state in an unused state, in which the use of the storage space has been completed. The zone included in the inactive zone "INACTIVE ZONE" may include an empty zone "EMPTY", in an empty state in which data is not stored, and/or a full zone "FULL", in a state in which the zone is stored fully with data.

The memory controller 210 may allocate a part of a buffer memory device 230 as a write buffer for each target memory zone in order to write data to a physical zone. The open zone "OPEN" may refer to a selected zone for performing a write operation, that is, a zone to which the portion of the write buffer is allocated. The memory system 200 may perform a program operation on a memory block included in the open zone "OPEN".

In an example embodiment, when a program command (or write command) for a zone other than the open zone "OPEN" is generated, and when all regions of the write buffer are allocated to the open zone "OPEN", the memory controller 210 may convert at least one of the open zones "OPEN" into a closed zone "CLOSED". That is, a closed zone "CLOSED" may be converted from an open zone "OPEN".

In an example embodiment, when the data is programmed (or written) in all pages of a memory block corresponding to an open zone "OPEN", the memory controller 210 may convert the open zone "OPEN" into a closed zone "CLOSED". The memory controller 210 may then convert the closed zone "CLOSED into a full zone "FULL". The full zone "FULL" may refer to a zone in which data is written in all pages in a corresponding memory block.

In an example embodiment, when an external device 100 provides a memory system 200 with an erase command for a full zone "FULL" or an active zone "ACTIVE ZONE", a memory system 200 erases the corresponding the full zone "FULL", and a memory controller 210 converts the full zone "FULL" into an empty zone "EMPTY". The empty zone "EMPTY" is a zone in which a corresponding a memory block is an empty.

In a zone-based memory system 200 that allocates a zone for each application program and stores data for performing the application, an error may occur in a zone accessed to perform a write request or a read request from the external device 100.

The zone management circuit 30 may close the zone with the error and open a new memory zone for use to improve the reliability of the data already written in the target memory zone in which the error is generated. As a result, data loss is reduced through data recovery using the target memory zone and use of the target memory zone going forward.

Read and write operations may be accompanied by moving or copying data in a zone with errors by opening a new memory zone, but additional time may be required to process the data.

In disclosed embodiments, however, a zone management circuit 30 may be configured to determine whether to maintain the allocation of the error zone to the external device 100, that is, whether to continue to use the error zone. This determination is based on the available capacity of the memory device 220 including the error zone or the size of written data in the memory device 220.

Figure 5:
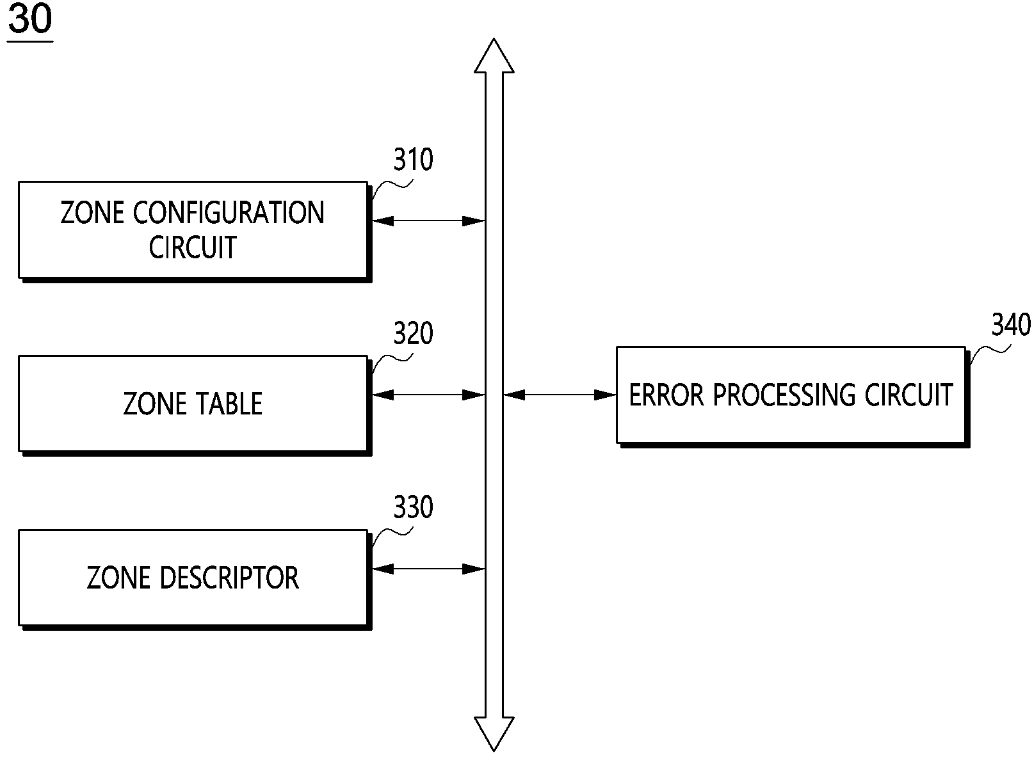
FIG. 5 is a block diagram illustrating a zone management circuit in accordance with embodiments of the disclosure.

FIG. 5 is a block diagram illustrating a zone management circuit in accordance with embodiments of the disclosure.

Referring to FIG. 5, a zone management circuit 30 may include a zone configuration circuit 310, a zone table 320, a zone descriptor 330, and an error processing circuit 340.

According to a request from an external device 100, such as for example an allocation request, the zone configuration circuit 310 may allocate or release a physical zone corresponding to a logical zone. The zone configuration circuit 310 may control a memory device 220 to store (or write) data transmitted from an external device 100 and to use a buffer memory device 230 in a corresponding physical zone.

The zone table 320 may manage zone block information indicating at least one memory block allocated to each physical zone. When the zone configuration circuit 310 allocates a new memory block to the physical zone or releases a memory block from the physical zone, the zone table 320 may be updated with the allocation of the new memory block to the physical zone or the release of the memory block from the physical zone.

When an error is generated while an access operation for processing the data input/output IO in accordance with a request from the external device 100, the zone table 320 may store an error log for the physical zone with the error, under the control of the zone configuration circuit 310, in a specific region of the memory device 220.

The zone descriptor 330 may manage a write pointer indicating a logical block address of write data. An example of write data is data to be written that is transmitted from the external device 100.

The zone configuration circuit 310 may control the memory device 220 so that the write data is sequentially written in a corresponding zone using the write pointer.

The error processing circuit 340 may detect an error when an error occurs in a target memory zone. The error can be detected during the data input/output operation, ordered by a write request from the external device 100, for the target memory zone of the memory device 220.

When an error is generated in the target memory zone, the error processing circuit 340 may close the target memory zone and may open a new memory zone that is used to secure the written data in the target memory zone, or data to be written, to prevent data loss. The error processing circuit 340 may recover the detected error in the target memory zone and may continue to use the target memory zone.

In some embodiments, the error processing circuit 340 may close a target memory zone and allocate a new memory zone based on an available capacity of the memory device 220. Further, the error processing circuit 340 may recover the target memory zone and then use the recovered target memory zone, that is, store (or write) the data in the target memory zone. The error processing circuit 340 may monitor the size of the written data in a physical storage region, including the target memory zone, to check the available capacity of the memory device 220.

The error processing circuit 340 may use a value such as write latency to determine whether the target memory zone should be closed. Write latency (write delay time) is proportional to the amount of written data in the target memory zone and inversely proportional to the available capacity of the target memory zone. Thus, the determination is based on the available capacity of the memory device 220 or the size of the written data.

For example, when the error processing circuit 340 requires a relatively longer time to move the written data, a write latency that is equal to or greater than a first threshold value TH1 may result. The first threshold value TH1, therefore, may be representative of a size of the written data in the target memory zone that is equal to or greater than a first reference value. In this example, the available capacity of the target memory zone is relatively small compared to another target memory zone, so the error processing circuit 340 may control the zone configuration circuit 310 to recover the error in the target memory zone and to use the target memory zone in an open state. When the write latency is less than the first threshold value TH1, however, the error processing circuit 340 may control the zone configuration circuit 310 to allocate a new memory zone and move data of the target memory zone to the new memory zone.

The error processing circuit 340 may obtain a value, based on the available capacity of the memory device 220, to determine whether to close or to continue to use the target memory zone. As an example, a write amplification factor (WAF) may be used.

In some embodiments, the write amplification factor may be an amount of data that is written into the memory device 220 compared with an amount of data requested by the external device 100 to be written to the memory device 220. Accordingly, the write amplification factor value may be proportional to the amount of the written data in the target memory zone and inversely proportional to an available storage space of the target memory zone.

Thus, when the amount of the written data, such as for example the amount of programmed data in a first target memory zone, is relatively small compared to a second target memory zone, the zone configuration circuit 310 may be controlled to allocate a new memory zone and move the written data of the first target memory zone to the new memory zone. On the other hand, when the write amplification factor value is greater than or equal to a predetermined second threshold value TH2, the zone configuration circuit 310 may recover the target memory zone and maintain the target memory zone in an open state for use.

For example, when the size of the written data in the target memory zone is less than a second reference value, and when the write amplification factor value is less than the second threshold value TH2, the zone configuration circuit 310 may allocate a new memory zone and move the written data of the target memory zone to the new memory zone. In an embodiment, when the write amplification factor value is greater than or equal to the second threshold value TH2, the zone configuration circuit 310 may recover the error of the target memory zone and use the target memory zone, which is maintained in an open state.

The error processing circuit 340 may obtain a value to determine whether to close or to continue the use of the target memory zone based on the available capacity of the memory device 220. As an example, a lifetime value, which is a ratio of the remaining storage space to the total storage space of the memory device 220, can be used. The remaining storage space may be, for example, the total storage space of the memory device 220, subtracting the size of the written data in the memory device 220. When the lifetime value is less than a preset third threshold value TH3, the error processing circuit 340 may control the zone configuration circuit 310 to close the target memory zone and allocate the data written in the target memory zone to a new memory zone.

When the lifetime value is equal to or greater than the third threshold value TH3, and less than a preset fourth threshold value TH4, the error processing circuit 340 may obtain a write latency, and allocate a new memory zone based on the write latency. Alternately, when the lifetime value is equal to or greater than the third threshold value TH3 and less than a fourth threshold value TH4 which is preset, the error processing circuit 340 may control the zone configuration circuit 310 to continue to use the target memory zone. Further, when the lifetime value is equal to or greater than the fourth threshold value TH4, the error processing circuit 340 may obtain a write amplification factor, and control the zone configuration circuit 310 to allocate a new memory zone or to continue to use the target memory zone based on the write amplification factor.

After the write data is buffered in the buffer memory device 230 in response to a write request from an external device 100, a memory system 200, for example, a memory controller 210, may transmit a response to the write request to the external device 100. When the external device 100 receives the response, the external device 100 may determine that the write operation has been performed normally.

The error processing circuit 340 may detect an error in the target memory zone before or after transmitting the response signal to the write request to the external device 100.

In some embodiments, when the error is detected after transmitting the signal in response to the write request to the external device 100, the error is detected when the write data is programmed in a corresponding target memory zone after the write data transmitted from the external device 100 is buffered in the buffer memory device 230. The error processing circuit 340 may control the zone configuration circuit 310 to allocate a temporary memory zone, and write the written data in the target memory zone and the data buffered in the buffer memory device 230 to the temporary memory zone.

The zone configuration circuit 310 may allocate a new memory zone to an application that provides the programmed data in the temporary memory zone. The zone configuration circuit 310 may sequentially program the programmed data in the temporary memory zone according to logical block addresses.

In other embodiments, when the error is detected before transmitting the signal in response to the write request to the external device 100, the error is detected before write data transmitted from the external device 100 is buffered to the buffer memory device 230.

The error processing circuit 340 may inform the external device 100 that the write request has failed. The error processing circuit 340 may transmit a zone program error message (NAND PROGRAM ERROR SENSE KEY) set to inform the external device 100 of a write fail state according to the error in the target memory zone.

In response to the zone program error message, the external device 100 may request that the target memory zone be managed as a finish zone, that is, a finish state, to the error processing circuit 340.

The error processing circuit 340 may close the target memory zone in response to the request provided from the external device 100 and manage the target memory zone as the finish zone. Thus, the finish zone is no longer used until the target memory zone is reset.

In addition, the external device 100 may request to re-perform the failed write request in a newly allocated memory zone.

Figure 6:
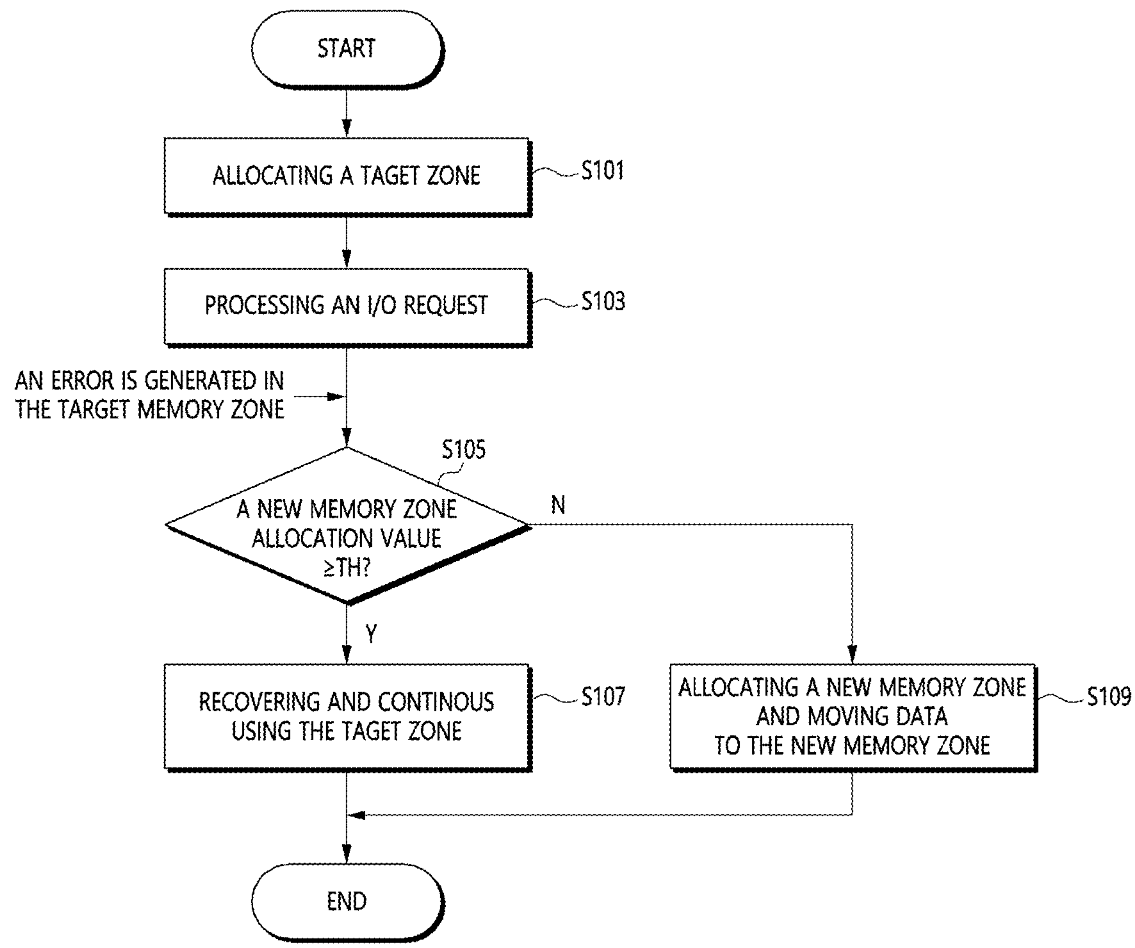
FIG. 6 is a flow chart illustrating a method of operating a memory system in accordance with embodiments of the disclosure.

FIG. 6 is a flow chart illustrating a method of operating a memory system in accordance with embodiments of the disclosure.

A memory controller 210 may allocate a physical zone, that is, a target memory zone corresponding to a logical zone, according to at least one request from an external device 100 (S101).

The memory controller 210 may access the target memory zone to process an I/O request, including a write request or a read request, from the external device 100 (S103). An error may be generated in the target memory zone due to various causes such as a physical defect of a memory device 220 while accessing the target memory zone and processing I/O request.

When an error is generated in the target memory zone, the memory controller 210 may determine whether a new memory zone allocation value is equal to or greater than a threshold value TH (S105). For example, the new memory zone allocation value may be determined based on the available capacity of the memory device 220.

When the new memory zone allocation value is equal to or greater than the threshold value TH, the memory controller 210 may recover the target memory zone and continue to use the target memory zone (S107).

When the new memory zone allocation value is less than the threshold value TH, the memory controller 210 may allocate a new memory zone and move data of the target memory zone to the new memory zone (S109).

In some embodiments, the memory controller 210 may determine the new memory zone allocation value based on at least one of a write latency, a write amplification factor, and a lifetime value.

The write latency is a value required to move (copy) the data written in the target memory zone to another zone. The write latency may be proportional to the amount of data written in the target memory zone and inversely proportional to the available capacity of the target memory zone. When the write latency is greater than or equal to the first threshold value TH1, which is preset, the memory controller 210 may recover the target memory zone and continue to use the target memory zone. When the write latency is less than the first threshold value TH1, the memory controller 210 may allocate a new memory zone and move the written data of the target memory zone to the new memory zone.

In some embodiments, the write amplification factor may be a ratio of an amount of data actually written in the memory device 220 to an amount of data requested by the external device 100 to be written to the memory device 220. Accordingly, the write amplification factor may be proportional to the amount of the written data in the target memory zone and inversely proportional to the available capacity of the target memory zone.

When the write amplification factor is less than a second threshold value TH2, the memory controller 210 may allocate a new memory zone and move the written data of the target memory zone to the new memory zone. In example embodiments, when the write amplification factor value is greater than or equal to the second threshold value TH2, the memory controller 210 may recover the target memory zone and control the target memory zone to maintain and to continue to use the target memory zone with an open state.

The lifetime value may be a ratio of the remaining storage space to the total storage space of the memory device 220. When the lifetime value is less than a third threshold value TH3, the memory controller 210 may close the target memory zone and allocate a new memory zone for moving the written data of the target memory zone. When the lifetime value is equal to or greater than the third threshold value TH3 and less than the fourth threshold value TH4, the memory controller 210 may manage the target memory zone based on the write latency. When the lifetime value is equal to or greater than the fourth threshold value TH4, the memory controller 210 may manage the target memory zone based on the write amplification factor.

Figure 7:
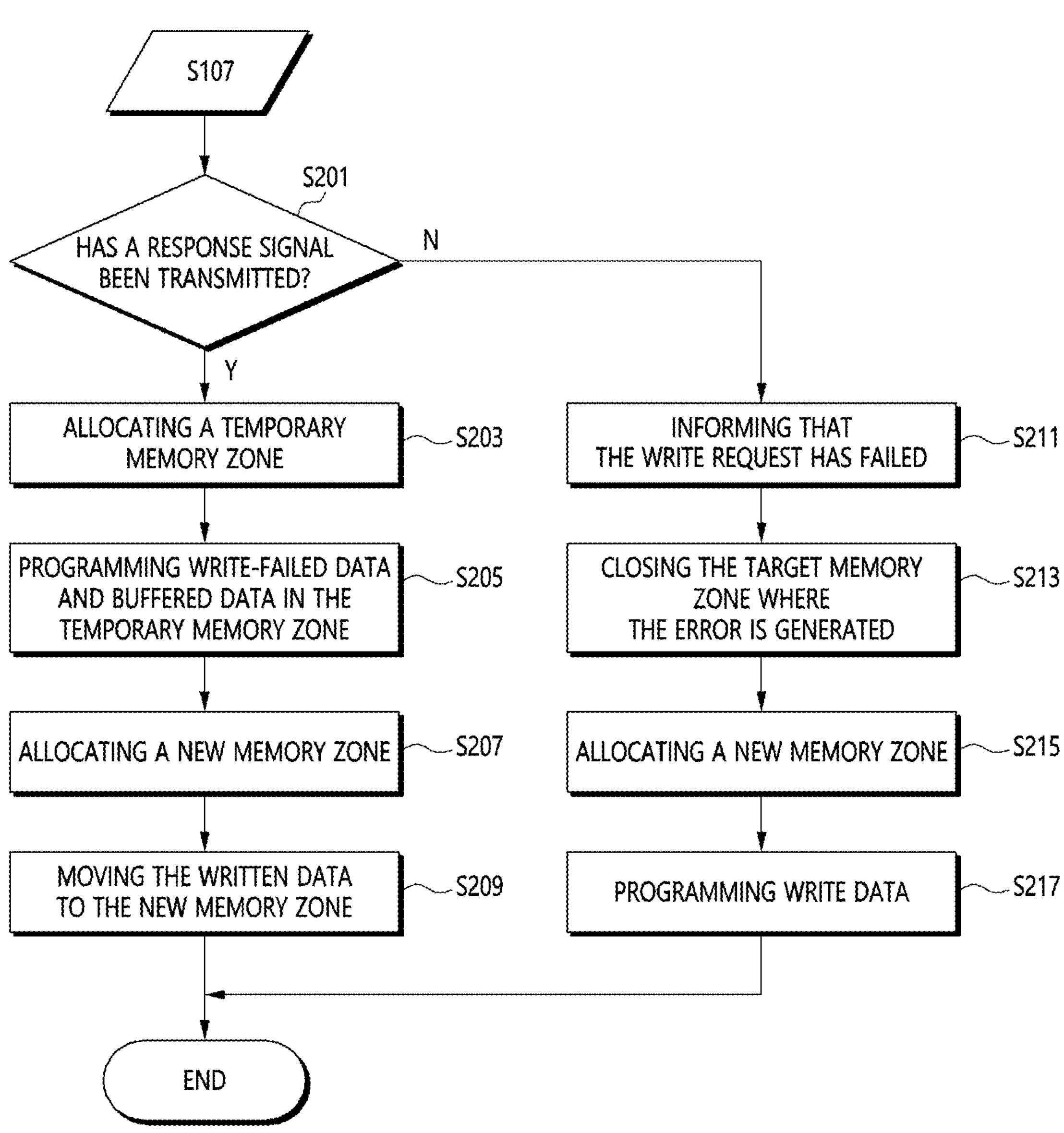
FIG. 7 is a flow chart illustrating a method of operating a memory system in accordance with embodiments of the disclosure.

FIG. 7 is a flow chart illustrating a method of operating a memory system in accordance with embodiments of the disclosure.

FIG. 7 illustrates a process in which a memory controller 210 closes a target memory zone in which an error has been generated and allocates a new memory zone.

When an error is detected while performing (or processing) a write operation according to a write request using the target memory zone, the memory controller 210 may determine whether a signal in response to the write operation has been transmitted to an external device 100 (S201).

When the error is detected after transmitting the response signal to the external device 100 (S201: Y), the memory controller 210 may control the zone configuration circuit 310 to allocate a temporary memory zone (S203). Written data in the target memory zone, buffered data, and write-failed data in the buffer memory device 230 may be programmed in the temporary memory zone (S205).

In addition, the memory controller 210 may allocate a new memory zone to an application that provided the programmed data in the temporary memory zone (S207). The memory controller 210 may sequentially move the programmed data from the temporary memory zone to the new memory zone according to the logical block address of the programmed data in the temporary memory zone (S209). For example, the memory controller 210 may sequentially program the data of the temporary memory zone to the new memory zone according to the logical block address of the written data.

When the error is detected before transmitting the response signal to the external device 100 (S201: N), the memory controller 210 may inform the external device 100 that the write request has failed (S211).

In an embodiment, the memory controller 210 may transmit a zone program error message (NAND PROGRAM ERROR SENSE KEY), which informs the external device 100 of a write fail state according to the error in the target memory zone.

In response to the zone program error message, the external device 100 may request that the memory controller 210 manage the target memory zone as a finish zone.

The memory controller 210 closes the target memory zone where the error is generated, in response to the request from the external device 100 for managing the target memory zone (S213). The memory controller 210 manages the target memory zone as the finish zone so that the finish zone is no longer used until the target memory zone is reset.

In addition, the external device 100 may request to write the write-failed data in a new memory zone. In response to the request for programing the write-failed data in the new memory zone, the memory controller 210 allocates the new memory zone (S215) and programs the write data, that is, the write-failed data, in the new memory zone (S217).

When an error is generated in a specific zone during a write operation, the zone may be efficiently managed, that is, maintained or closed, based on an available capacity of the memory device, or based on the available capacity of the specific zone.

The above described embodiments of the example embodiments are intended to illustrate and not to limit the example embodiments. Various alternatives and equivalents are possible. The invention is not limited by the embodiments described herein. Nor is the invention limited to any specific type of semiconductor device. Another additions, subtractions, or modifications are obvious in view of the present disclosure and are intended to fall within the scope of the appended claims.

What is claimed is:

1. A memory system comprising:

a memory device including a plurality of memory regions; and a memory controller configured to control the memory device, receive an allocation request provided from an external device, allocate some of the plurality of memory regions based on the allocation request, perform a write request from the external device to a first memory region from among the allocated memory regions, detect an error in the first memory region occurring from a data operation ordered by the write request, obtain a value needed to close the first memory region based on a size of written data in the first memory region based on the write request;

compare the value memory to a first threshold based on a first reference value, maintain the allocation of the first memory region in response to the value greater than or equal to the first threshold, and close the first memory region in response to the value less than the first threshold.

2. The memory system of claim 1, the memory controller further configured to recover the error in the first memory region and use the first memory region as the allocated memory region when the value is greater than or equal to the first threshold.

3. The memory system of claim 1, the memory controller further configured to allocate a second memory region from among the allocated memory regions, except for the first memory region, and to move the written data from the first memory region to the second memory region when the value is less than the first threshold.

4. The memory system of claim 3, the memory controller further configured to transmit a response signal to the external device indicating performance of the write request in the first memory region, and in response to the response signal transmitted after the error is detected, to allocate a temporary memory region, except for the first memory region, and to move the written data in the first memory region to the temporary memory region.

5. The memory system of claim 4, the memory controller further configured to sequentially write the written data from the temporary memory region to the second memory region based on a logical block address of the written data in the temporary memory region.

6. The memory system of claim 3, the memory controller further configured to, in response to the error detected before transmitting a response signal indicating performance of the write request in the first memory region, transmit a program error message to the external device, manage the first memory region as a finished state based on a request from the external device receiving the program error message, allocate the second memory region based on the allocation request from the external device, and re-perform the write request in the second memory region.

7. The memory system of claim 1, wherein the first reference value is based on a write latency, and wherein the write latency is a time for moving the written data in the first memory region to a second memory region, based on the size of the written data in the first memory region.

8. The memory system of claim 1, wherein the first reference value is based on a write amplification factor, and wherein the write amplification factor is a ratio of size of written data in the first memory region to a size of data of the write request.

9. The memory system of claim 1, the memory controller further configured to compare the value to a second threshold based on a second reference value, maintain the allocation of the first memory region in response to the value greater than or equal to the first threshold and the second threshold, and close the first memory region in response to the value less than the first threshold and the second threshold, wherein the first reference value is based on a write latency and the second reference value is based on a write amplification factor, wherein the write latency is a time for moving the written data in the first memory region to a second memory region except for the first memory region, based on the size of the written data in the first memory region, and wherein the write amplification factor is a ratio of size of written data in the first memory region to a size of data of the write request.

10. A method of operating a memory system including a memory device and a memory controller, the method comprising:

allocating, by the memory controller configured to control the memory device including a plurality of memory regions, some of the plurality of memory regions as allocated memory regions according to an allocation request of an external device;

performing a write request of the external device in at least one of the allocated memory regions;

detecting an error in a first memory region occurring from a data operation ordered by the write request, obtaining a value needed to close the first memory region based on a size of written data in the first memory region based on the write request;

comparing the value to a first threshold based on a first reference value;

maintaining the allocation of the first memory region in response to the value greater than or equal to the first threshold; and closing the first memory region in response to the value less than the first threshold.

11. The method of claim 10, further comprising recovering the error of the first memory region and using the first memory region as the at least one of the allocated memory regions when the value is greater than or equal to a first threshold.

12. The method of claim 11, wherein the recovering the error of the first memory region further comprises, in response to detecting the error after transmitting a response signal for performing the write request to the external device, allocating, by the memory controller, a temporary memory region except for the first memory region; and writing, by the memory controller, data related to the write request to the temporary memory region.

13. The method of claim 12, further comprising:

sequentially writing the written data of the temporary memory region to a second memory region based on a logical block address of the written data of the temporary memory region.

14. The method of claim 11, wherein the recovering the error of the first memory region further comprises, in response to detecting the error before transmitting a response signal for performing the write request to the external device, transmitting, by the memory controller, a program error message to the external device;

managing, by the memory controller, the first memory region as a finished state at a request of the external device that receives the program error message; and re-performing, by the memory controller, the write request by allocating a second memory region based on the allocation request from the external device.

15. The method of claim 10, further comprising comparing the value to a second threshold based on a second reference value; and allocating a second memory region, from among the plurality of memory regions except for the first memory region, and moving the written data in the first memory region to the second memory region in response to the value less than the second threshold.

16. The method of claim 10, wherein the first reference value is based on a write latency, wherein the write latency indicates a time for moving the written data in the first memory region to a second memory region, based on the size of the written data in the first memory region.

17. The method of claim 10, wherein the first reference value is based on a write amplification factor, and wherein the write amplification factor is a ratio of size of written data in the first memory region to a size of data of the write request.

18. The method of claim 10, wherein the method further comprises:

comparing the value to a second threshold based on a second reference value;

maintaining the allocation of the first memory region in response to the value greater than or equal to the first threshold and the second threshold; and closing the first memory region in response to the value less than the first threshold and the second threshold, wherein the first threshold is based on a write latency and the second threshold is based on a write amplification factor, wherein the write latency is a time for moving the written data in the first memory region to a second memory region except for the first memory region, based on the size of the written data in the first memory region, and wherein the write amplification factor is a ratio of size of written data in the first memory region to a size of data of the write request.

* * * * *